United States Patent
Barret et al.

(10) Patent No.: US 10,106,130 B2
(45) Date of Patent: Oct. 23, 2018

(54) DEVICE FOR LATERAL SPRAYING OF A WASHING LIQUID FOR A WIPER ARM FOR A SYSTEM FOR WIPING A PANE OF A MOTOR VEHICLE

(71) Applicant: Valeo Systèmes d'Essuyage, Le Mesnil Saint Denis (FR)

(72) Inventors: Guillaume Barret, Laps (FR); Denis Thebault, Clermont Ferrand (FR)

(73) Assignee: Valeo Systèmes d'Essuyage, Le Mesnil Saint Denis (FR)

( * ) Notice: Subject to any disclaimer, the term of this patent is extended or adjusted under 35 U.S.C. 154(b) by 61 days.

(21) Appl. No.: 14/945,896

(22) Filed: Nov. 19, 2015

(65) Prior Publication Data
US 2016/0144832 A1    May 26, 2016

(30) Foreign Application Priority Data
Nov. 25, 2014 (FR) ..................... 14 61423

(51) Int. Cl.
*B60S 1/52*        (2006.01)
(52) U.S. Cl.
CPC ............... *B60S 1/524* (2013.01); *B60S 1/522* (2013.01)
(58) Field of Classification Search
CPC ....................................... B60S 1/522
USPC ..................................... 15/250.04
See application file for complete search history.

(56) References Cited

U.S. PATENT DOCUMENTS

| | | | | |
|---|---|---|---|---|
| 3,428,992 A | * | 2/1969 | Di Giorgio | B60S 1/522 15/250.04 |
| 3,793,670 A | * | 2/1974 | Riester | B60S 1/522 15/250.04 |
| 3,940,068 A | * | 2/1976 | Mohnach | B05B 1/14 15/250.04 |
| 4,439,887 A | * | 4/1984 | Fischer | B60S 1/522 15/250.04 |
| 4,516,288 A | * | 5/1985 | Fizyta | B60S 1/522 15/250.04 |

(Continued)

FOREIGN PATENT DOCUMENTS

| | | |
|---|---|---|
| DE | 19826846 C1 | 3/2000 |
| DE | 102010064178 A1 | 6/2012 |

(Continued)

OTHER PUBLICATIONS

FR2747975A1 (machine translation), 1997.*

(Continued)

*Primary Examiner* — Andrew A Horton
(74) *Attorney, Agent, or Firm* — Osha Liang LLP

(57) ABSTRACT

The invention relates to a device (11) for lateral spraying of a washing liquid designed to be attached to a windscreen wiper arm (3) of a system for wiping a pane of a motor vehicle, characterized in that it comprises a supply cannula (35), a duct for distributing the liquid (39) and at least two nozzles (28) for spraying the liquid, the nozzles (28) and the supply cannula (35) being fluidically connected via the intermediary of the distribution duct (39), characterized in that the nozzles (28) are arranged on either side of an axis (A) defined by the supply cannula (35).

Figure 1:
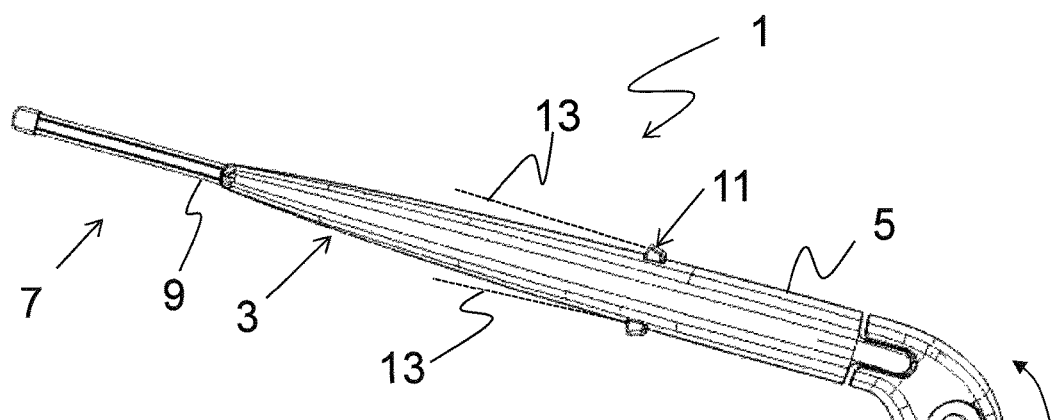

The invention also relates to a wiper arm (3) for a system for wiping a pane of a motor vehicle, comprising a lateral spraying device (11) such that it is possible to spray on each lateral side of the arm.

14 Claims, 5 Drawing Sheets

(56) References Cited

U.S. PATENT DOCUMENTS

| | | | |
|---|---|---|---|
| 5,433,382 A | 7/1995 | Baumgarten et al. | |
| 5,842,251 A * | 12/1998 | LeFrançois | B60S 1/3497 15/250.04 |
| 5,865,376 A | 2/1999 | Krizek et al. | |
| 6,094,772 A | 8/2000 | West | |
| 6,442,788 B1 * | 9/2002 | Fleischer | B60S 1/522 15/250.04 |
| 8,381,348 B2 * | 2/2013 | Egner-Walter | B60S 1/381 15/250.04 |
| 2002/0000481 A1 * | 1/2002 | Utz | B60S 1/522 239/284.1 |
| 2003/0009841 A1 * | 1/2003 | Sato | B60S 1/522 15/250.04 |
| 2005/0086758 A1 * | 4/2005 | Arkashevski | B60S 1/32 15/250.02 |
| 2007/0018012 A1 * | 1/2007 | Harris | B05B 1/00 239/284.1 |
| 2013/0269139 A1 * | 10/2013 | Wolfgarten | B60S 1/32 15/250.03 |
| 2013/0291328 A1 * | 11/2013 | Schmid | B60S 1/3805 15/250.04 |

FOREIGN PATENT DOCUMENTS

| | | | | |
|---|---|---|---|---|
| EP | 1985513 A1 | * | 10/2008 | ............ B60S 1/3862 |
| FR | 1295138 A | * | 6/1962 | ............ B60S 1/3415 |
| FR | 2747975 A1 | | 10/1997 | |
| FR | 2783225 A1 | * | 3/2000 | ............ B60S 1/522 |
| FR | 2859963 A1 | | 3/2005 | |
| FR | 2902063 A1 | | 12/2007 | |
| JP | 2002-302019 A | | 10/2002 | |
| JP | 2002-321599 A | | 11/2002 | |
| KR | 20040007138 A | | 1/2004 | |
| WO | WO 2014102062 A1 | * | 7/2014 | ............ B60S 1/4038 |

OTHER PUBLICATIONS

WO2014102062 A1 (machine translation), 2014.*
FR1295138A (machine translation), 1962.*
Preliminary Search Report issued in corresponding French Application No. FR1461423, dated Jul. 22, 2015 (2 pages).

* cited by examiner

DEVICE FOR LATERAL SPRAYING OF A WASHING LIQUID FOR A WIPER ARM FOR A SYSTEM FOR WIPING A PANE OF A MOTOR VEHICLE

The present invention relates to a device for lateral spraying of a washing liquid for a wiper arm for a system for wiping a pane of a motor vehicle, a wiper arm for a wiping system and a wiping system.

In order to ensure proper cleaning of a pane, it is essential to spray a washing liquid upstream of the wiping blade.

To that end, there are known spraying nozzles arranged on the body of a vehicle, which spray screen wash liquid onto the pane to be cleaned. However, the sprayed jet is often aimed only at a single impact zone, such that the washing liquid does not act evenly over the entire surface to be cleaned.

Also known are wiper arms which are equipped with nozzles for spraying a washing liquid. In this case, one or more washing jets are generally sprayed onto the pane in a general direction perpendicular to the plane defined by the pane and just upstream of the wiping blade.

In the case of a rear wiper arm, such a solution is too costly. Indeed, as the rear pane is in the aerodynamic shadow of the car, it comes into contact with less dirt than the windscreen, which is exposed frontally to all the dirt.

That is why the wiping system for the rear pane is actuated far less frequently than the wiping system for the windscreen.

That also leads to the fact that the wiper arm and its module for spraying a washing liquid must be less costly than an equivalent system for the windscreen.

In order to improve the situation for spraying washing liquid, there are also known wiper arms equipped with nozzles for laterally spraying a washing liquid. Documents DE102010064178, FR2859963, U.S. Pat. No. 6,094,772, JP2002321599 or DE19826846 can be cited by way of example.

However, in some of these documents, the nozzles are an integral part of the arm such that the arm cannot be made in a modular fashion so as to be able to offer constructors arms with or without spraying nozzles.

In others, the part bearing the spraying nozzle is difficult and/or costly to produce, in particular with numerous lips which are difficult to de-mould.

The present invention has the object of at least partially remedying the abovementioned drawbacks by presenting a solution which is simple to produce and cost-effective.

To that end, the invention relates to a device for lateral spraying of a washing liquid designed to be attached to a windscreen wiper arm of a system for wiping a pane of a motor vehicle, characterized in that it comprises a liquid supply cannula, a duct for distributing the liquid and at least two nozzles for spraying the liquid, the nozzles and the supply cannula being fluidically connected via the intermediary of the distribution duct, and in that the nozzles are arranged on either side of an axis defined by the supply cannula.

Thus, the device makes it possible to spray the washing liquid laterally with respect to the liquid inlet via the supply cannula. It is thus possible to propose a range of wiper arms with or without a device for lateral spraying of a washing liquid, depending on the constructors' requirements.

The spraying device according to the invention may further comprise one or more of the following features, considered in isolation or in combination:

The nozzles are for example arranged symmetrically with respect to the axis defined by the supply cannula.

According to one aspect, the general spraying directions of the nozzles may be parallel with one another.

According to another aspect, the nozzles each have an inclined general spraying direction, away from the axis defined by the supply cannula.

Advantageously, the spraying device is formed of a spraying base and of a washing liquid supply cover, the base being attached to the cover.

The duct for distributing the liquid is formed at the junction between the base and the cover by matching imprint shapes in the form of open grooves of which one is borne by the base and the other by the cover.

The base has at each end at least one spraying nozzle and the cover comprises the supply cannula.

One of the imprints is for example surrounded by an attachment rib and the other imprint by an attachment channel matching the attachment rib.

The base and the cover may be attached to one another by welding, in particular by ultrasound.

Alternatively, the device consists of a single solid part.

The device has in particular a parallelepipedal general shape.

It is possible to provide that the device comprises through openings designed to receive welding projections borne by the wiper arm.

As a variant, the device comprises snap-fitting arms designed to engage with associated ribs borne by the wiper arm.

The invention also relates to a wiper arm for a system for wiping a pane of a motor vehicle, characterized in that it comprises a lateral spraying device as defined hereinabove so as to allow liquid to be sprayed on each lateral side of the wiper.

According to one aspect, the arm may comprise positioning openings in its lateral wall and, in the installed state, the spraying device projects laterally, with its spraying nozzles, from the wiper arm.

According to another aspect, the wiper arm comprises welding projections engaging with through openings created in the spraying device.

According to yet another aspect, the arm comprises ribs engaging with snap-fitting arms borne by the spraying device.

The spraying device is located essentially at the middle of the arm in its longitudinal direction.

The invention also relates to a wiping system comprising a wiper arm as defined hereinabove.

Figure 2:
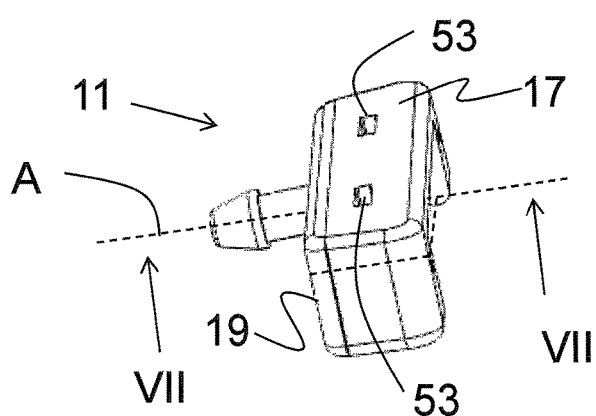
Figure 3:
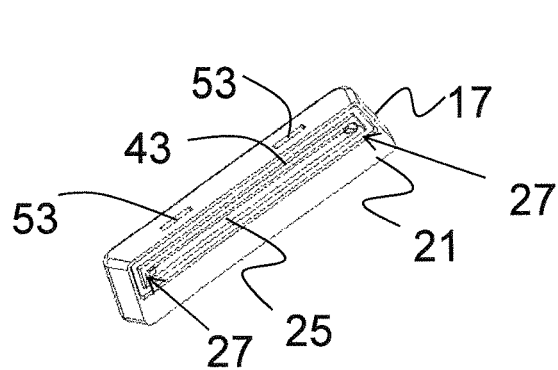
Figure 4:
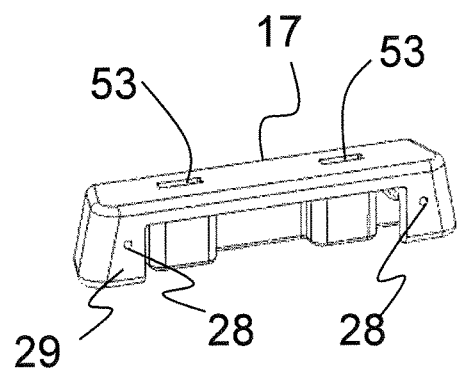
Figure 5:
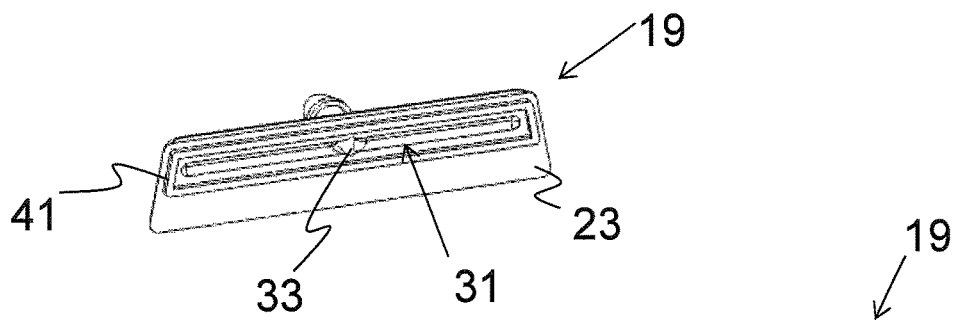
Figure 6:
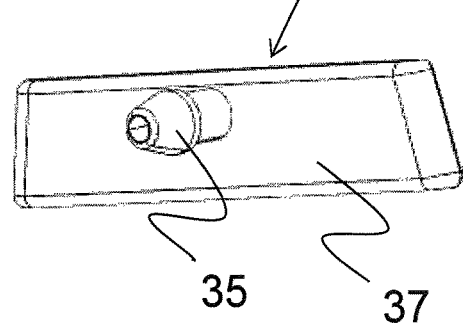
Figure 7:
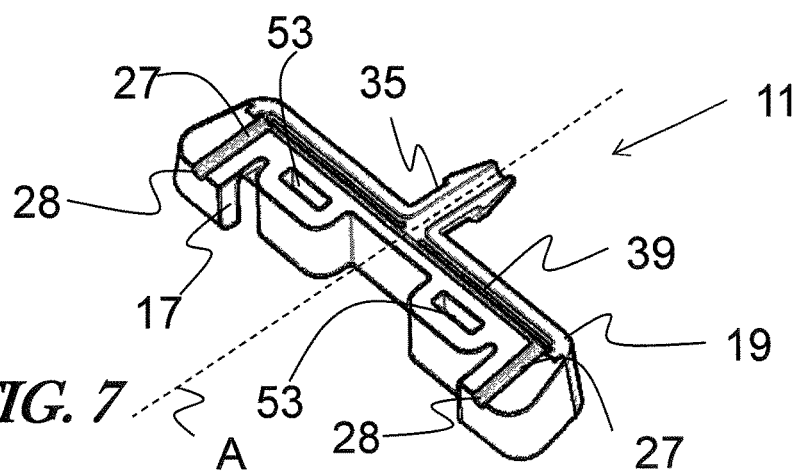
Figure 8:
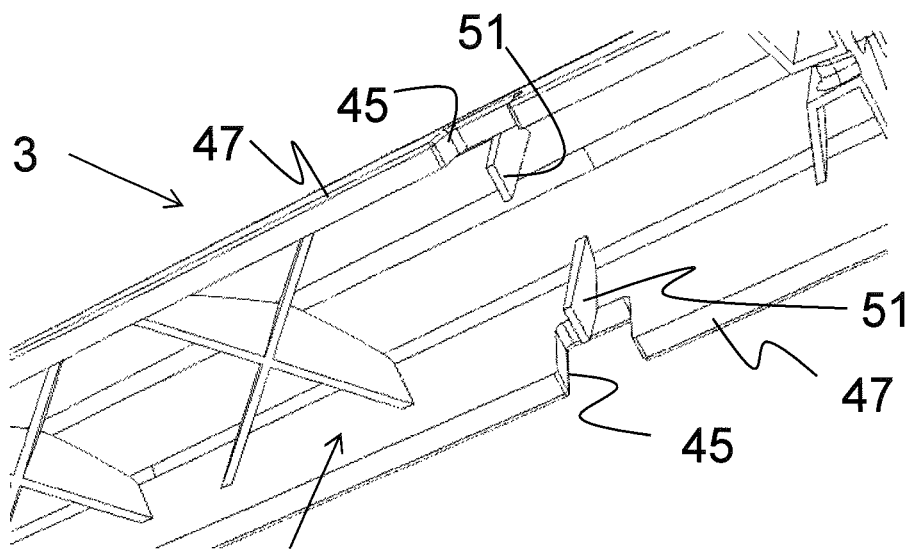
Figure 9:
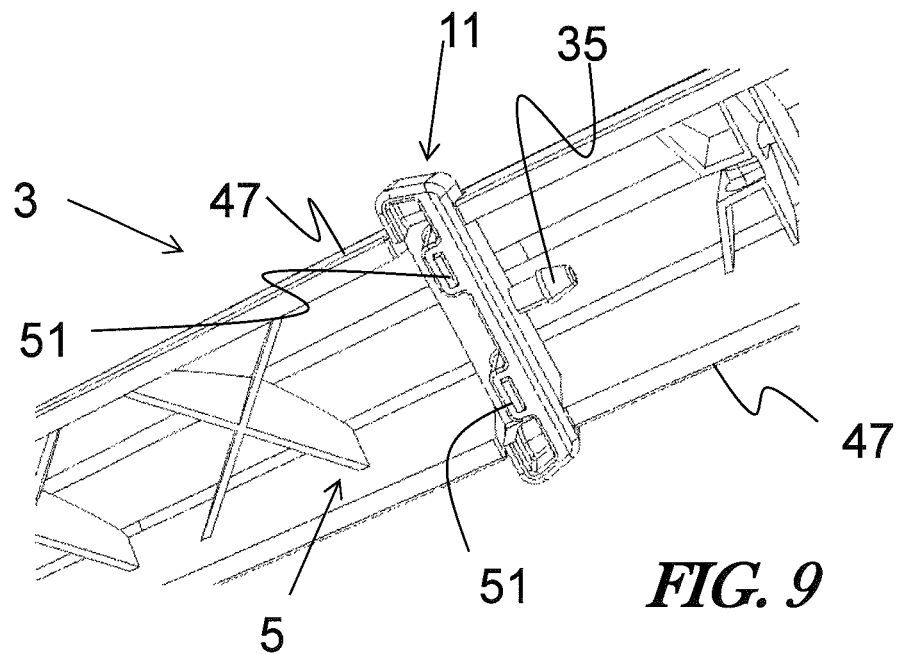
Figure 10:
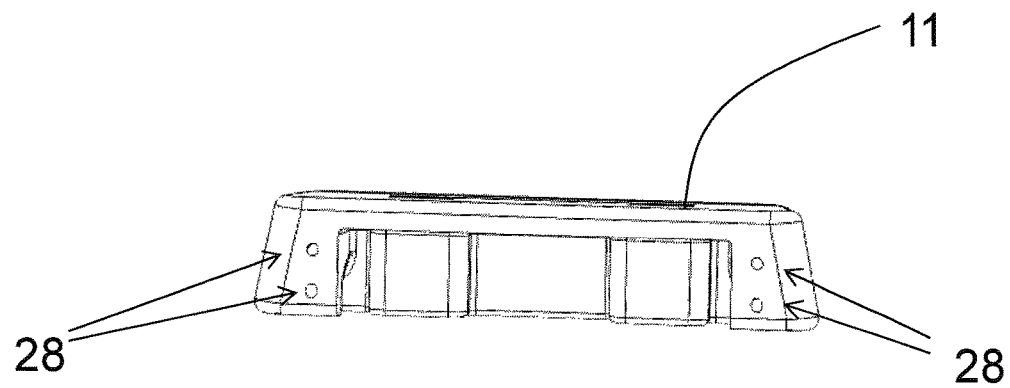
Figure 11:
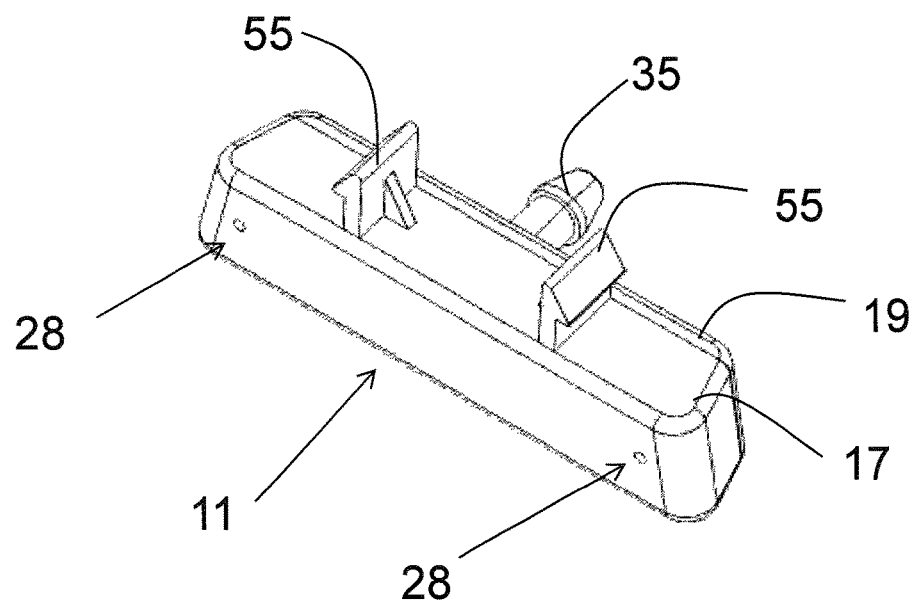
Figure 12:
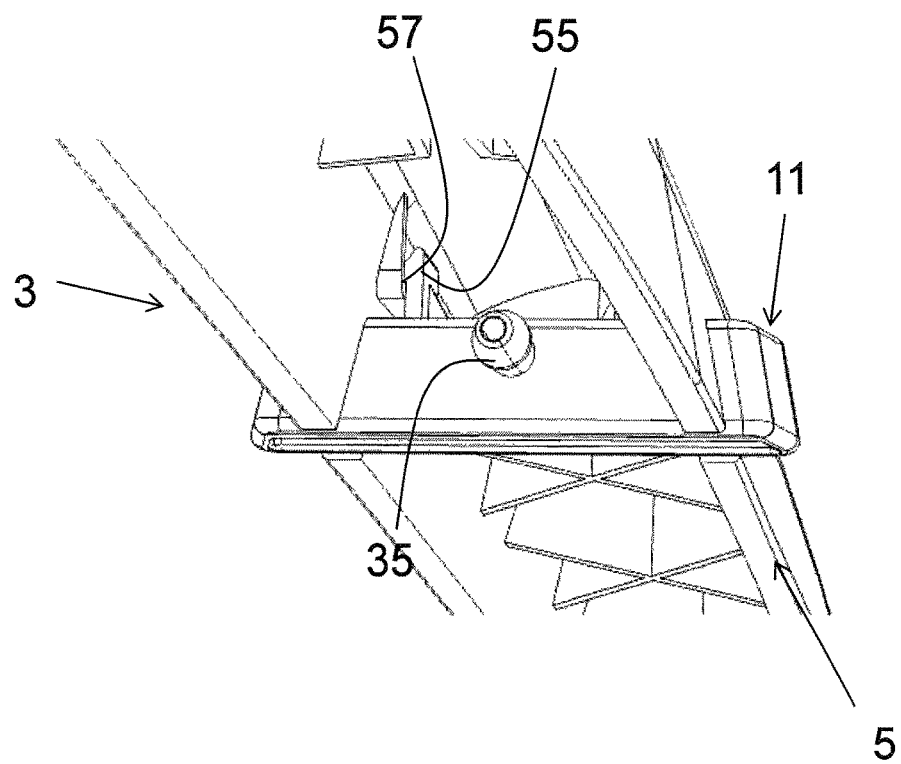

Other advantages and features will emerge upon reading the description of the invention and of the appended drawings, in which:

FIG. 1 is a top view of a wiping system comprising an arm equipped with a device for lateral spraying of a washing liquid, FIG. 2 is a perspective side view of the device for lateral spraying of a washing liquid in the assembled state, FIG. 3 is a perspective view of the spraying base, FIG. 4 is a perspective view of the spraying base rotated through 180° with respect to FIG. 3, FIG. 5 is a perspective view of the supply cover, FIG. 6 is a perspective view of the supply cover rotated through 180° with respect to FIG. 5, FIG. 7 is a schematic section view along a line VII-VII of FIG. 1, FIG. 8 is a partial perspective view from below of the wiper arm, FIG. 9 is a partial perspective view from below of the wiper arm with a device for lateral spraying of a washing liquid in the assembled state, FIG. 10 is a perspective view of another embodiment of the device for lateral spraying of a washing liquid in the assembled state, FIG. 11 is a perspective view of yet another embodiment of the device for lateral spraying of a washing liquid in the assembled state, and FIG. 12 is a partial perspective view from below of the wiper arm with a device for lateral spraying of a washing liquid of FIG. 11 in the assembled state.

There now follows a description of an exemplary embodiment with reference to the figures.

In all the figures, the same elements bear the same references.

The following embodiments are examples. Although the description refers to one or more embodiments, that does not necessarily mean that each reference relates to the same embodiment, or that the features apply only to one single embodiment. Individual features of various embodiments may also be combined to provide other embodiments.

FIG. 1 shows a wiping system 1 comprising a wiper arm 3, in particular a wiper arm for a rear pane of a motor vehicle.

This arm 3 comprises a shell 5, for example made of plastic, and a wiper 7 with a wiping blade 9 for wiping a pane.

The arm 3 is moreover equipped with a device 11 for lateral spraying of a washing liquid, having a parallelepipedal general shape. In FIG. 1, sprayed jets of a washing liquid are referenced 13.

As shown in FIG. 1, the jets 13 are oriented essentially parallel to the longitudinal extent of the arm 3 and of the wiper 7, such that, during back-and-forth wiping movements, indicated by the arrow 15, the pane is sprayed both ahead of and behind the moving wiping blade 9. For a cleaning cycle, washing liquid is sprayed onto the pane during the first or first few back-and-forth movements, followed by one or more back-and-forth movements without spraying liquid in order to dry the pane. The spraying device is located essentially at the middle of the arm 3 in the longitudinal direction. Particularly advantageously, and as shown in FIG. 1, the spraying device is located in line with a lower end of the wiping blade in order to spray the liquid over the entire length of the wiping blade.

The device 11 for lateral spraying of a washing liquid is shown in perspective in its entirety in FIG. 2 and is formed of a spraying base 17 (see FIGS. 3 and 4) and of a washing liquid supply cover 19 (see FIGS. 5 and 6), which are attached to one another. The base 17 and the cover 19 are for example made of plastic and produced by injection.

FIG. 3 shows the face 21 of the base 17 designed to be in contact with/attached to a corresponding face 23 of the cover 19 shown in FIG. 5.

On this face 21 there is created an imprint 25 in the form of an open groove. At the ends of this imprint 25, there are created two holes 27 which open onto the opposite face 29 of the base 17 from the face 21 (see FIG. 4). These holes 27 form nozzles 28 for spraying the washing liquid.

As shown in FIG. 5, there is also created, on the face 23 of the cover 19, an imprint 31 in the form of an open groove.

At its centre, this imprint 31 has a supply duct 33 formed by a supply cannula 35 created in one piece with the cover 19 and arranged on the opposite face 37 of the cover from the face 23 (see FIG. 6). The supply cannula 35 is designed to be connected to a flexible washing liquid supply tube (not shown).

Thus, when the base 17 and the cover 19 are assembled, the imprints 25 and 31 form, by virtue of matching shapes, a duct for distributing the washing liquid 39.

This distribution duct 39 is clearly visible in FIG. 7, showing a cross section through the thickness of the device 11 for lateral spraying of a washing liquid. It shows clearly how the washing liquid entering via the cannula 35 is then divided into two flows and distributed as far as the spraying nozzles 28. It will therefore be understood that the base 17 has at each end at least one, in the present case two, spraying nozzle(s) 28 which are fluidically connected to the distribution duct 39, and that the supply cannula 35 is also fluidically connected to the distribution duct 39.

The nozzles 28 and the supply cannula 35 are thus fluidically connected via the intermediary of the distribution duct 39, and the nozzles 28 are arranged on either side of an axis A defined by the supply cannula 35.

More specifically, the nozzles 28 are arranged symmetrically with respect to the axis A defined by the supply cannula 35.

As shown in the figures, the general spraying directions of the nozzles 28 are parallel with one another and also parallel to the axis of the supply cannula 35.

According to one variant which is not shown, the nozzles 28 each have an inclined general spraying direction, away from the axis A defined by the supply cannula 35, in the direction of the wiping blade 9. In this variant, the general spraying directions of the nozzles 28 may be parallel or convergent in the direction of the wiping blade 9.

In order to facilitate assembly and at the same time ensure a seal, one of the imprints, in this case the imprint 31 of the cover 19, is surrounded by an attachment rib 41 (FIG. 5) and the other imprint, in this case the imprint 25, by an attachment channel 43 matching the attachment rib 41.

Thus, all that is necessary for assembly is to place the cover 19 onto the base 17 and then attach them to one another, for example by welding, in particular by ultrasound.

With reference to FIG. 8, for the lateral spraying of the washing liquid, the wiper arm 3 comprises positioning openings 45 in the lateral wall 47 of its shell 5, and the longitudinal extent of the device 11 is such that, in the installed state, the spraying device 11 projects laterally, with its spraying nozzles 28, from the wiper arm 3 (FIGS. 1 and 9).

In order to attach the device 11 to the wiper arm 3, the shell 5 has, on its underside, that is to say that face designed to be oriented towards a pane, welding projections 51.

These welding projections 51 engage in a first instance by slotting into through openings 53 created in the base 17 parallel to the junction plane between the base 17 and the cover 19 (see in particular FIGS. 2, 3, 4, 7 and 9).

Once slotted in as shown in FIG. 9, it is for example possible to weld by ultrasound the spraying device 11 to the projections 51.

It will therefore be understood that the spraying device 11 is simple to manufacture and is cost-effective and, by simple assembly of a base 17 with a cover 19, the assembly may easily be mounted on the wiper arm 3.

FIG. 10 shows a variant of a spraying device 11 which differs from that of FIGS. 1 to 9 by virtue of the fact that it has four spraying nozzles 28 instead of two, two at each end and arranged one above the other.

FIGS. 11 and 12 show yet another variant of the spraying device 11 which differs in that the through openings 53 are replaced with snap-fitting arms 55 designed to engage with associated ribs 57 borne by the wiper arm 3 (see FIG. 12).

The invention claimed is:

1. A wiper arm for a wiping system of a motor vehicle, the wiper arm comprising:
   a first lateral wall having at least one first positioning opening formed therethrough
   a second lateral wall having at least one second positioning opening formed therethrough; and
   a device that fits into one of the at least one first or second positioning openings, and laterally sprays a washing liquid, the device comprising:
      a washing liquid supply cover that includes a supply cannula,
      a spraying base,
      a duct that distributes the washing liquid and is formed at a junction between the spraying base and the washing liquid supply cover and,
      at least two nozzles that spray the washing liquid,
         wherein the nozzles and the supply cannula are fluidically connected via an intermediary of the duct,
         wherein the nozzles are arranged on two sides of an axis defined by the supply cannula,
         wherein the device sprays the washing liquid on two lateral sides of the wiper arm, and
         wherein the duct extends through the first positioning opening and through the second positioning opening, such that the nozzles are located external to the lateral walls.

2. The wiper arm according to claim 1, wherein the nozzles are arranged symmetrically with respect to the axis defined by the supply cannula.

3. The wiper arm according to claim 1, wherein spraying directions of the nozzles are parallel.

4. The wiper arm according to claim 1, wherein each of the nozzles has an inclined spraying direction that is inclined with respect to the axis defined by the supply cannula.

5. The wiper arm according to claim 1,
   wherein the duct is formed at the junction between the spraying base and the washing liquid supply cover by matching imprint shapes in a form of open grooves of which one is borne by the spraying base and the other by the washing liquid supply cover, and the spraying base, at each end, has at least one of the nozzles.

6. The wiper arm according to claim 5, wherein a first imprint of the matching imprint shapes is surrounded by an attachment rib and a second imprint of the matching imprint shapes is surrounded by an attachment channel matching the attachment rib.

7. The wiper arm according to claim 5, wherein the spraying base and the washing liquid supply cover are attached to one another by ultrasound welding.

8. The wiper arm according to claim 1, the device has a parallelepipedal shape.

9. The wiper arm according to claim 1, further comprising through openings that receive welding projections borne by the wiper arm.

10. The wiper arm according to claim 1, further comprising snap-fitting arms that engage with associated ribs borne by the wiper arm.

11. The wiper arm according to claim 1, wherein the wiper arm comprises welding projections that engage with through openings of the device.

12. The wiper arm according to claim 1, wherein the wiper arm comprises ribs that engage with snap-fitting arms of the device.

13. The wiper arm according to claim 1, wherein the device is located at a middle of the wiper arm in a longitudinal direction of the wiper arm.

14. The wiping system comprising the wiper arm according to claim 1.

* * * * *